United States Patent
Zirwas et al.

(10) Patent No.: US 10,367,557 B2
(45) Date of Patent: Jul. 30, 2019

(54) ARTIFICIALLY MUTUAL-COUPLED ANTENNA ARRAYS

(71) Applicant: Nokia Solutions and Networks Oy, Espoo (FI)

(72) Inventors: Wolfgang Zirwas, Munich (DE); Muhammad Bilal Amin, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/752,031

(22) PCT Filed: Jun. 28, 2016

(86) PCT No.: PCT/FI2016/050466
§ 371 (c)(1),
(2) Date: Feb. 12, 2018

(87) PCT Pub. No.: WO2017/029426
PCT Pub. Date: Feb. 23, 2017

(65) Prior Publication Data
US 2018/0241442 A1    Aug. 23, 2018

Related U.S. Application Data

(60) Provisional application No. 62/206,452, filed on Aug. 18, 2015.

(51) Int. Cl.
*H04B 7/02* (2018.01)
*H04B 7/0456* (2017.01)
(Continued)

(52) U.S. Cl.
CPC .......... *H04B 7/046* (2013.01); *H04B 7/0469* (2013.01); *H04B 7/0617* (2013.01); *H04B 7/086* (2013.01);
(Continued)

(58) Field of Classification Search
CPC .... H04B 7/046; H04B 7/0469; H04B 7/0617; H04B 7/086; H04B 7/024; H04L 25/0204;
(Continued)

(56) References Cited

U.S. PATENT DOCUMENTS

2012/0076019 A1*  3/2012  McGowan .......... H01Q 3/2617
                                                              370/252
2013/0324061 A1   12/2013  Behdad
2017/0310000 A1*  10/2017  Gustavsson ............ H01Q 1/246

FOREIGN PATENT DOCUMENTS

WO      2009105418       8/2009

OTHER PUBLICATIONS

International Search Report and Written Opinion received for corresponding Patent Cooperation Treaty Application No. PCT/FI2016/050466, dated Oct. 21, 2016, 13 pages.
(Continued)

*Primary Examiner* — Zewdu A Kassa
(74) *Attorney, Agent, or Firm* — Harrington & Smith

(57) ABSTRACT

A mechanism for mutually coupling multiple antennas for transmission in a wireless communication environment, wherein, for a received or transmitted radio signal a precoding matrix is created that includes artificial mutual antenna coupling coefficients and processing the received or transmitted radio signal using the created precoding matrix.

16 Claims, 6 Drawing Sheets

(51) Int. Cl.
  *H04B 7/06* (2006.01)
  *H04B 7/08* (2006.01)
  *H04L 25/02* (2006.01)
  *H04W 28/08* (2009.01)
  *H04B 7/024* (2017.01)

(52) U.S. Cl.
  CPC ........ *H04L 25/0204* (2013.01); *H04L 25/025* (2013.01); *H04L 25/0212* (2013.01); *H04W 28/08* (2013.01); *H04B 7/024* (2013.01)

(58) Field of Classification Search
  CPC ... H04L 25/0212; H04L 25/025; H04W 28/08
  USPC ................ 375/267, 260, 259, 316, 295, 219
  See application file for complete search history.

(56) References Cited

OTHER PUBLICATIONS

Ivrlac, M. et al.: "The Multiport Communication Theory". IEEE Circuits and Systems Magazine, vol. 14, No. 3, pp. 27-44, Aug. 20, 2014. ISSN 1531-636X. Cited in the application Chapter V. Applications: A. Array Gain, B. Diversity, pp. 37-40.

Zirwas, W. et al.: "Channel Prediction for B4G Radio Systems". 2013 IEEE 77th Vehicular Technology Conference (VTC Spring), Jun. 2, 2013, Conference proceedings, 5 pages. ISSN 1550-2252.

Amin, M.B. et al.: "Advanced channel prediction concepts for 5G radio systems". 2015 International Symposium on Wireless Communication Systems (ISWCS), Aug. 25, 2015, Conference proceedings, pp. 166-170.

Becker, Randall T., "Precoding and Spatially Multiplexed MIMO in 3GPP Long-Term Evolution", High Frequency Electronics, Oct. 2009, pp. 18-26.

* cited by examiner

ARTIFICIALLY MUTUAL-COUPLED ANTENNA ARRAYS

RELATED APPLICATION

This application was originally filed as PCT Application No. PCT/FI2016/050466 filed Jun. 28, 2016 which claims priority benefit from U.S. Application No. 62/206,452, filed Aug. 18, 2015.

TECHNOLOGICAL FIELD

The described invention relates to wireless communication, and more specifically concerns mutually coupling multiple antennas for transmission.

BACKGROUND

Antenna to antenna mutual coupling is typically undesirable. Where an omni-directional first antenna is located in close proximity to a second antenna different from the intended recipient antenna, the second antenna tends to absorb and re-radiate energy radiated by the first antenna when transmitting. Similarly, when the second antenna transmits some of its energy is absorbed by the first antenna, hence the coupling is mutual. Sometimes this is referred to as mutual impedance since one antenna acts as a high-Ohm resistor to the other's transmission. By the same principal when either antenna is receiving, energy that it could have captured is influenced by the other nearby antenna. Mutual antenna coupling affects both antenna transmit and receive performance, and the physical layout of antenna arrays are often designed with lambda half spacing, which avoids or minimizes this mutual coupling.

Current cellular and WiFi systems utilize MIMO antenna transmission techniques, and future cellular systems such as 3GPP 5G (LTE-A) contemplate massive MIMO transmissions from the network/eNB side. Massive in this regard refers to the total number of antenna elements in the array. These massive MIMO antenna arrays for 5 GHz LTE-A systems can easily become very large in physical size, mainly due to the relatively large wavelength $\lambda$ which are in the range of 4 to 40 cm.

At the UE side a wavelength $\lambda$ in the range of about 10 cm allows the handset designer to place only a very limited number of UE antennas. But beamforming gains at the UE side would be of great value; two such examples being powerful interference rejection combining (IRC) filters and down-selection of relevant multipath components (MPC) for the relevant channel components.

At the network/eNB side, massive MIMO arrays of size 16×32 elements with half-$\lambda$ spaced antenna elements would conventionally exhibit a physical size of about 0.8 m*1.6 m. Implementing such a large physical size can be challenging for mobile operators who typically own the macro-cell sites in urban areas: larger antenna array sizes typically increases costs and accordingly the assumed performance; wind load becomes an increasingly important factor which may further increase implementation costs; and complaints about the aesthetics of and radiation from cell towers are likely to increase with increasingly large antenna arrays.

Embodiments of these teachings address some of the above issues by providing a physically smaller antenna array and increasing antenna performance in MIMO and beamforming scenarios.

DETAILED DESCRIPTION

Figure 1:
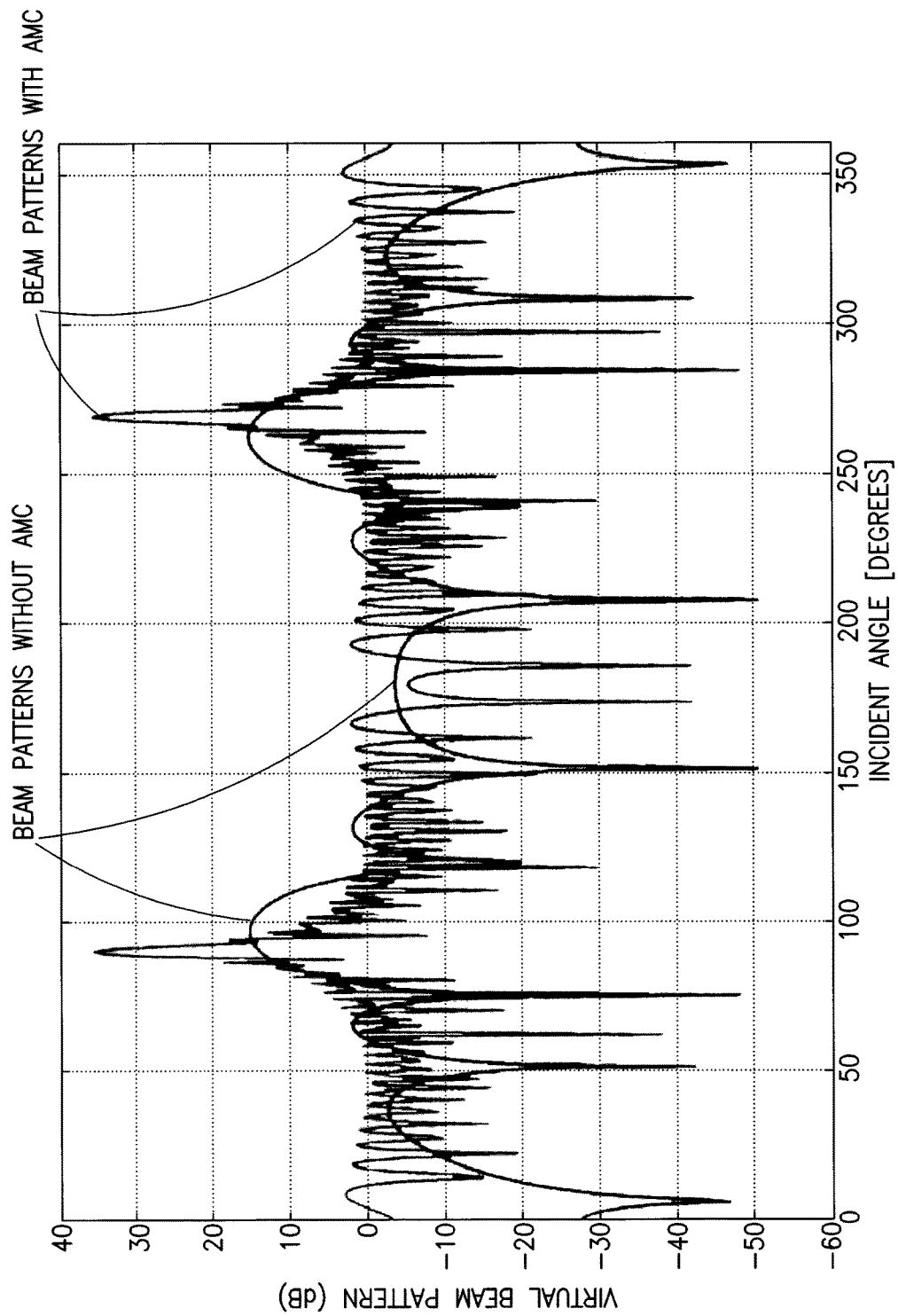
FIG. 1 is a beam pattern chart (virtual beam pattern in dB versus incident angle in degrees) for a virtual beamformer with 32 antenna elements, in which the closer-spaced plotlines illustrate artificial mutual coupling according to these teachings while the more widely spaced plotlines are without such artificial mutual coupling.

The example of mutual antenna coupling in the background section above illustrates physical mutual antenna coupling among omni-directional antennas. Antenna arrays typically employed in cellular base stations have (close to) lambda half spacing as it allows to generate one single steerable beam and additionally avoids physical mutual coupling between adjacent antenna elements. Directionality based on any type of beamforming provides great advantages in radio communications from increased throughput and decreased error rates, enabling a more efficient use of the radio spectrum via a higher re-use of radio frequencies over smaller geographic areas. Embodiments of these teachings here concern artificial mutual antenna coupling as opposed to physical mutual coupling, which as will be detailed further below enable a much greater directionality to antenna transmissions.

For physical antennas mutual coupling means that one antenna couples some part of its own signal into an adjacent antenna element or elements, and vice versa. In this regard, one specific form of mutual coupling is the transmission over a radio link from one antenna (the TX-antenna) to another antenna (the RX-antenna). For physically mutual-coupled antennas the coupling factor is more or less defined over the antenna geometry, the distance between antennas, etc. Artificial mutual antenna coupling as used herein means the coupling is done artificially as opposed to naturally in the physical space over which the antennas radiate their energy. In the non-limiting examples below this artificial mutual coupling is imposed mathematically, via executed software that adds mutual coupling coefficients into the beamforming matrix W, which is denoted herein as $W_{MC}$ when those mutual coupling coefficients are added.

With mutual coupling in general the resulting TX-beam pattern of an antenna array cannot be adequately described by a single vector, but by a complex matrix W of size N*N, where N is the integer number of antenna elements of the antenna array. $W_{MC}$ includes the mutual coupling coefficients for each antenna element to all other antenna elements. For uniform linear arrays (ULAs) in which the adjacent antenna elements are spaced a uniform distance from one another (typically some integer multiple of λ/2), such coupling coefficients are close to SI-functions—defined as sin x/x—, with zeros at integer multiples of λ/2. In general SI functions are idealized in that they generate a 1 at the diagonal elements of the matrix.

Mutual coupling is a well-known effect for physical antennas and so called super directivity is theoretically achievable for decreasingly smaller antenna distances. A paper by Michel T. Ivrlač and Josef A. Nossek entitled THE MULTIPORT COMMUNICATION THEORY (*IEEE Circuits and Systems Magazine,* 20 Aug. 2014, pages 27-44) describes that the directivity gain can increase eventually to $N^2$ instead of only N, which is the achievable limit for λ/2-spaced antenna arrays. But implementing these directivity gains faces practical and well-known challenges like increasing power losses even for high conductivity due to the large current flows, as well as for example a limited RF bandwidth.

Artificial mutual coupling of antennas according to certain embodiments of these teachings select the mutual coupling coefficients that are incorporated into the beamforming matrix $W_{MC}$ so as to achieve that so called super directivity, and this feature can be used to advantage in the future evolution of mobile radio systems even going beyond LTE Advanced (for example, so called 5G systems). Embodiments of these teachings enable efficient and small physical size MIMO antenna array implementations at the network radio access node (such as an eNB) as well as at the UE side. Embodiments of these teachings enable the generation of very narrow beams with very low half power beam width (HPBW) for below 6 GHz systems while achieving similar performance as physically large MIMO antenna arrays.

The artificial mutual antenna coupling techniques described herein can improve wireless performance at the UE side due to the large angle of arrival spread of the MIMO transmission received at the UE. With a large angle of arrival, a narrow beam with very low half power beam width (HPBW) of a few degrees would reduce the number of relevant multipath components much more effectively than a physically large massive MIMO antenna array at the network/transmitting side of the wireless divide, with a much smaller angle of departure spread.

Further, UEs can realize benefits in transmissions it receives from the network by performing its own artificial mutual antenna coupling to achieve super directivity in its own beamforming of the received signal. Specifically and as shown below, the UE can use quite simple liner channel predictors which, for the highly directional beams, would outperform much more complex predictors like conventional Kalman filters used in more conventional beamforming applications. In this manner artificially mutually coupled antenna arrays can become a main enabler for joint transmission CoMP and/or massive MIMO, both of which are valued for their outstanding interference mitigation capabilities. In the past CoMP and massive MIMO have been limited due to their sensitivity to CSI outdating, meaning the coherence interval over which channel estimates remain valid are short and so new channel measurements/estimates are needed quite frequently to effectively exploit the potential of conventional CoMP and massive MIMO.

Embodiments of these teachings enable high beamforming directivity gains for UEs having one or a few antenna elements, and for network access nodes that may even have a limited physical size for their antenna array regardless of whether it is a massive MIMO array.

The first-described embodiment is directed to the UE side, or more generally to a mobile radio device which may for example be embodied as a UE or as a machine-type communication (MTC) device. The mobile radio device has only one, or possibly a few antennas; LTE-A presumes a maximum of 8 antennas at the UE though future radio access technologies may support more than 8. In this first embodiment the concept of artificially mutual coupling (AMC) is applied to virtual beamformers in the mobile radio device.

Virtual beamforming means that UEs moving with moderate speed and straight lines estimate the channel multiple times for multiple close-by locations and store the measured CSI for each location. By combining the stored channel measurements using a single (or few) antenna elements a virtual antenna array—comprising a high number of virtual antennas—can be generated. Beams formed by such virtual antenna arrays can have already quite small half power beam width (HPBW). Adding super directivity by artificially mutual coupled antenna arrays at the network/transmitting side provides further significant directivity gains, which can be used for example to suppress extremely efficient multi path components (MPC).

The beamforming matrix in the mobile radio device controls phase and amplitude of the spatial signal seen by the mobile device's antenna(s), which might be virtual as explained above. By combining the signals from all (virtual) antenna elements, signals coming from different directions are accentuated or attenuated and for a proper design a beam might be formed. These beam—or beams—weight the signal of interest, noise, interference, etc. in order to best receive and maximize the signal of interest while minimizing interference and noise.

Further details concerning virtual beamforming may be seen in a paper by W. Zirwas and M. Haardt entitled CHANNEL PREDICTION FOR B4G RADIO SYSTEMS (*Proc. 77$^{th}$ IEEE Vehicular Technology Conference VTC-Spring* 2013, Dresden Germany, 2-5 Jun. 2013, pages 326-330).

For virtually beamformed antenna elements all of the physical coupling coefficients are obviously zero, as at each time instant just a single antenna is being active. This fact allows the network to introduce antenna coupling artificially just by using a precoding matrix $W_{MC}$ as noted above, instead of precoding vector w on the virtual antenna elements for the generation of the virtual beampatterns. The result for suitably chosen values for the matrix off-diagonal elements can be seen in FIG. 1, which illustrates the achievable beam patterns with and without artificial mutual coupling (AMC) of the antennas. The more focused incident angles for the AMC plotlines show much more defined virtual beam patterns than the non-AMC beam patterns which are wider and exhibit a much lower amplitude at the most relevant beam directions where the incident angles are about 90 and 270 degrees. FIG. 1 clearly indicates the strong directivity gains for the artificially mutual-coupled antenna array.

Figure 2:
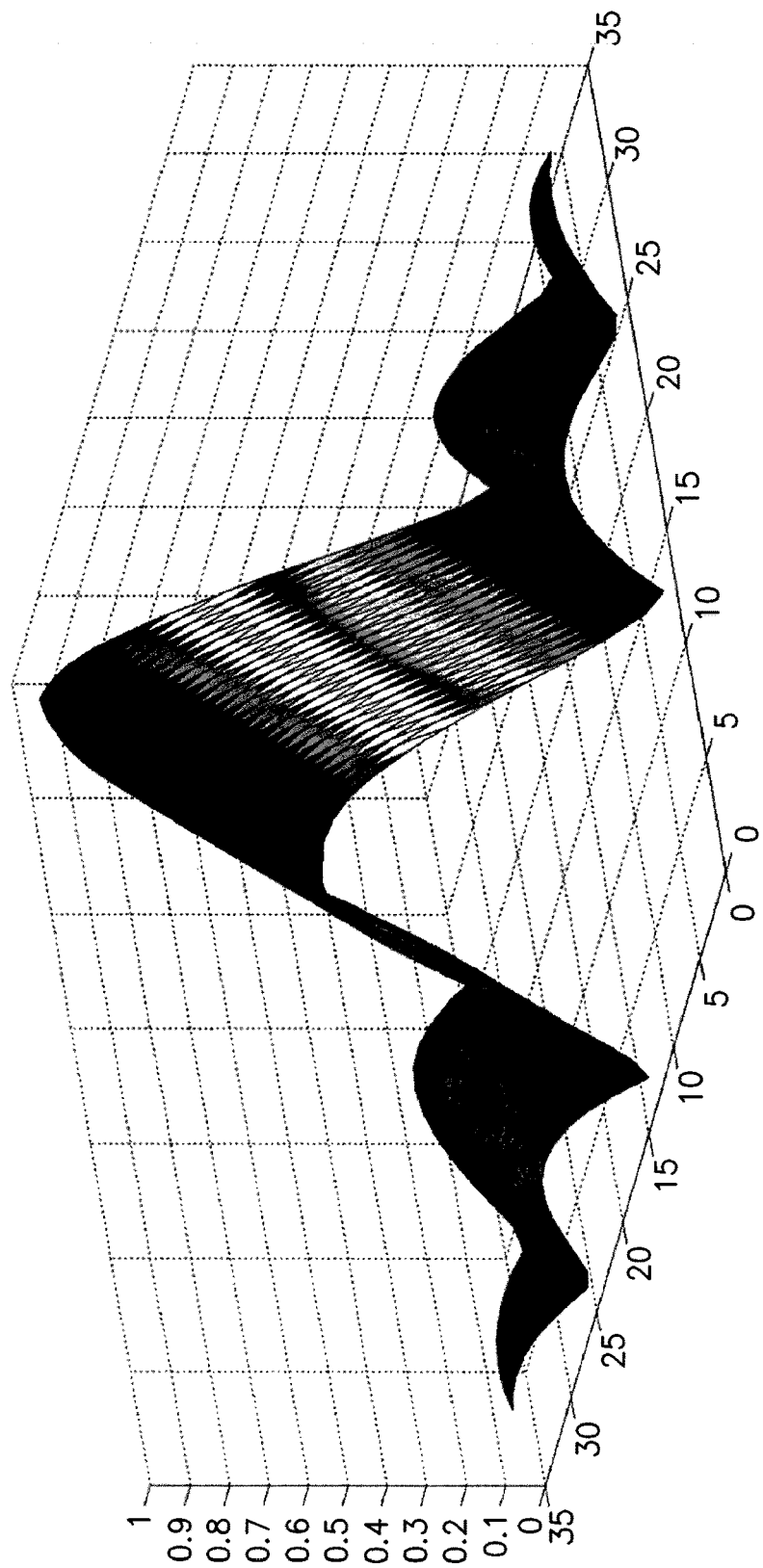
FIG. 2 is a three-dimensional plot showing amplitude for a typical allocation of mutual coupling elements for the artificial mutual coupling matrix $W_{MC}$.

FIG. 2 illustrates a typical allocation of amplitudes to matrix elements for the artificial coupling matrix $W_{MC}$. In this case SI functions similar as for physically coupled antenna elements have been used, but unlike physical antenna mutual coupling, in general for artificial mutual coupling there is full freedom for the selection of coupling elements in the matrix $W_{MC}$. A more detailed description can be found in a paper by Muhammad Bilal Amin, Wolfgang Zirwas and Martin Haardt, entitled ADVANCED CHANNEL PREDICTION CONCEPTS FOR 5G RADIO SYSTEMS (accepted for publication in *ISWCS*2015; Brussels, Belgium; 25 Aug. 2015).

The second-described embodiment is directed to the network side, and specifically to the network radio access node which may have only a physically small size MIMO array. In some conventional mutual coupled antenna arrays the antennas are sorted into groups (e.g., a maximum of 4 antennas per group for LTE radio standards) with uniform inter-element spacing, for example about 0.2×. This enables some physical super directivity gains per sub group of antennas. But for the physical antennas this super directivity fades away as the inter-group spacing becomes larger than the intra-group spacing, for example where the intra-group spacing between antenna elements is 0.2λ but the spacing between different 4-element groups is λ/2. An inter-group distance of λ/2 offers the additional benefit that the physical mutual coupling effects, which follow a SI-function, are more or less zero for λ/2-spacing and so the sub-groups will be mutually de-coupled by their physical spacing. But the tradeoff between 0.2λ and 0.5λ physical spacing is not so important with artificial mutual coupling because the advantages of physical-space coupling via the 0.2λ intra-group element spacing can be replicated artificially through the precoding matrix $W_{MC}$.

For 5G frequency division duplex (FDD) systems currently a grid of beam (GoB) concept is discussed the most, which encompasses massive MIMO arrays forming for example a set of 8 fixed narrow beams. This generates a low number of virtual effective antennas so that overhead for CSI RSs and/or uplink reporting of CSI information is limited, despite the potentially huge number of physical antenna elements in the array.

According to exemplary embodiments of these teachings, artificial mutual coupling of antennas can be applied with decoupled λ/2-spaced uniform linear arrays (ULA) to generate artificial directivity. One advantage of doing so is that more narrow beams can be formed for the same number of physical antenna elements. When the artificial coupling is done properly one can achieve the same directivity of a massive MIMO antenna array using a significantly lower number of antenna elements that are mutually coupled artificially.

Figure 3:
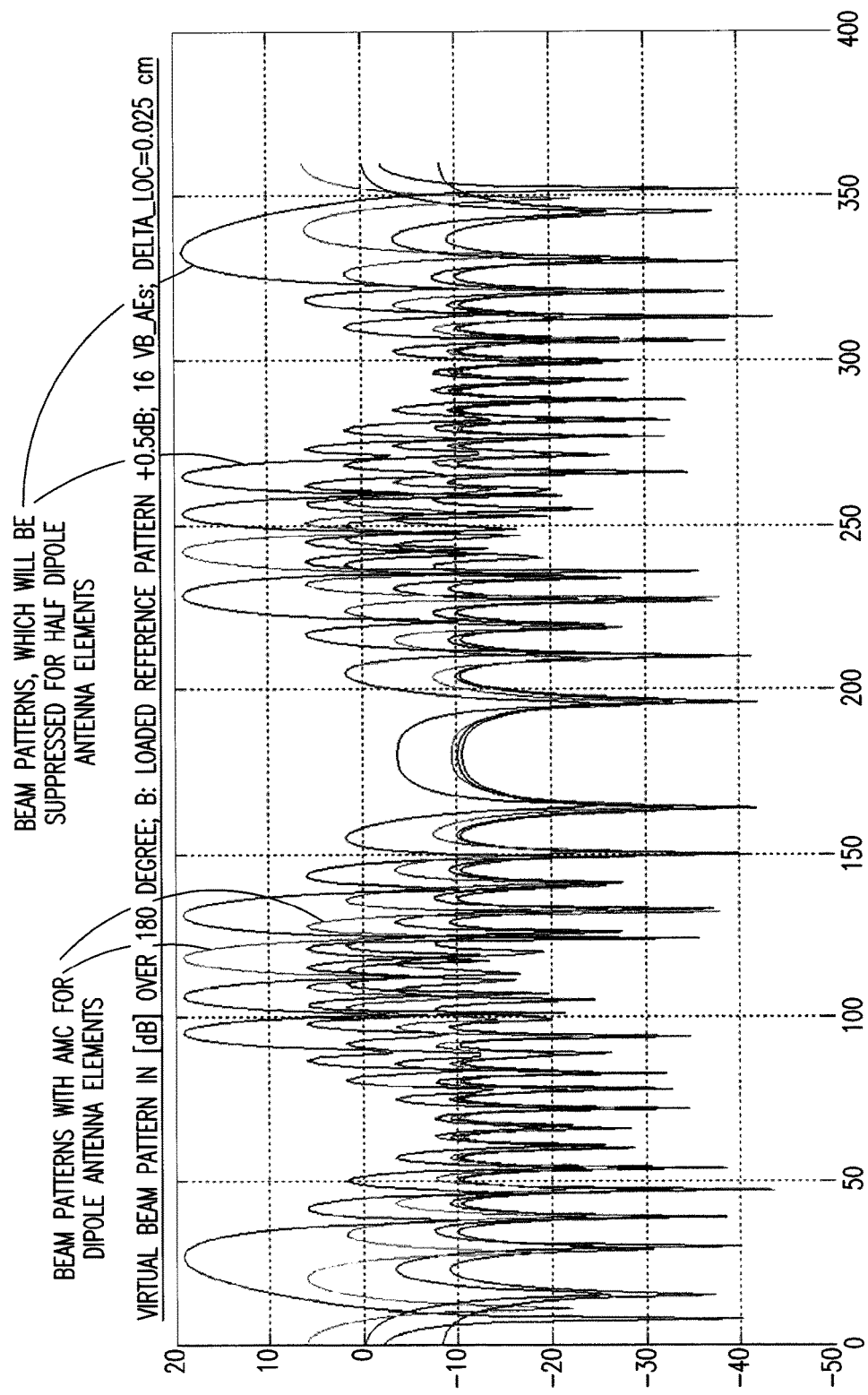
FIG. 3 is illustrates an example of artificial mutually coupled generated beams with a very narrow half power beamwidth at the eNBs for generation of the grid of beam per cell.

FIG. 3 illustrates plots of the beam patterns for four exemplary beams from an ULA with 16 antenna elements with λ/2-spacing, and is an example of artificial mutually coupled generated beams with very narrow half power beam width at the network side for generation of the grid of beams per cell. In this plot the SI-factor=1.37 while the Phi expansion factor=−7.8, and there is a 120 degree sector in which the beam patterns between about 30 to 150 degrees are of relevance. FIG. 3 reveals that the half power beam width HPBW is very low for a 16 element ULA and the sub-beams are well de-correlated.

The beam patterns of FIG. 3 are achieved with only 16 antenna elements, or equivalently a width of 16*5.5 cm=0.88 m (at an RF-frequency of 2.6 GHz). In other embodiments combining physical and artificial mutual coupling should allow for even lower dimensions. To achieve similar beam patterns without artificial mutual coupling would require significantly more antenna elements, for example 64 antenna elements in a massive MIMO array.

In various implementations the advantages of artificially mutually coupled antenna arrays include one or more of the following:
  super directivity gains of $N^2$ compared to N for virtually beamformed UE antennas or eNB antennas, which might have λ/2-spacing.
  antenna elements with λ/2 spacing at the network-side are useful because for this inter-element spacing conventional mutual coupling is zero or close to zero (similar as for virtual antenna elements). Therefore one can add any desirable artificial mutual coupling to this λ/2-spaced antenna array.
  artificial mutual coupling can span over much more than a few antenna elements (physical mutual coupling is typically limited to 2 to 4 antenna elements).
  artificial mutual coupling avoids losses (and it can be completely lossless), which for example may arise from strong current flows together with limited conductivity of real world antennas.
  artificial mutual coupling can be used over a large RF bandwidth.

Figure 4A:
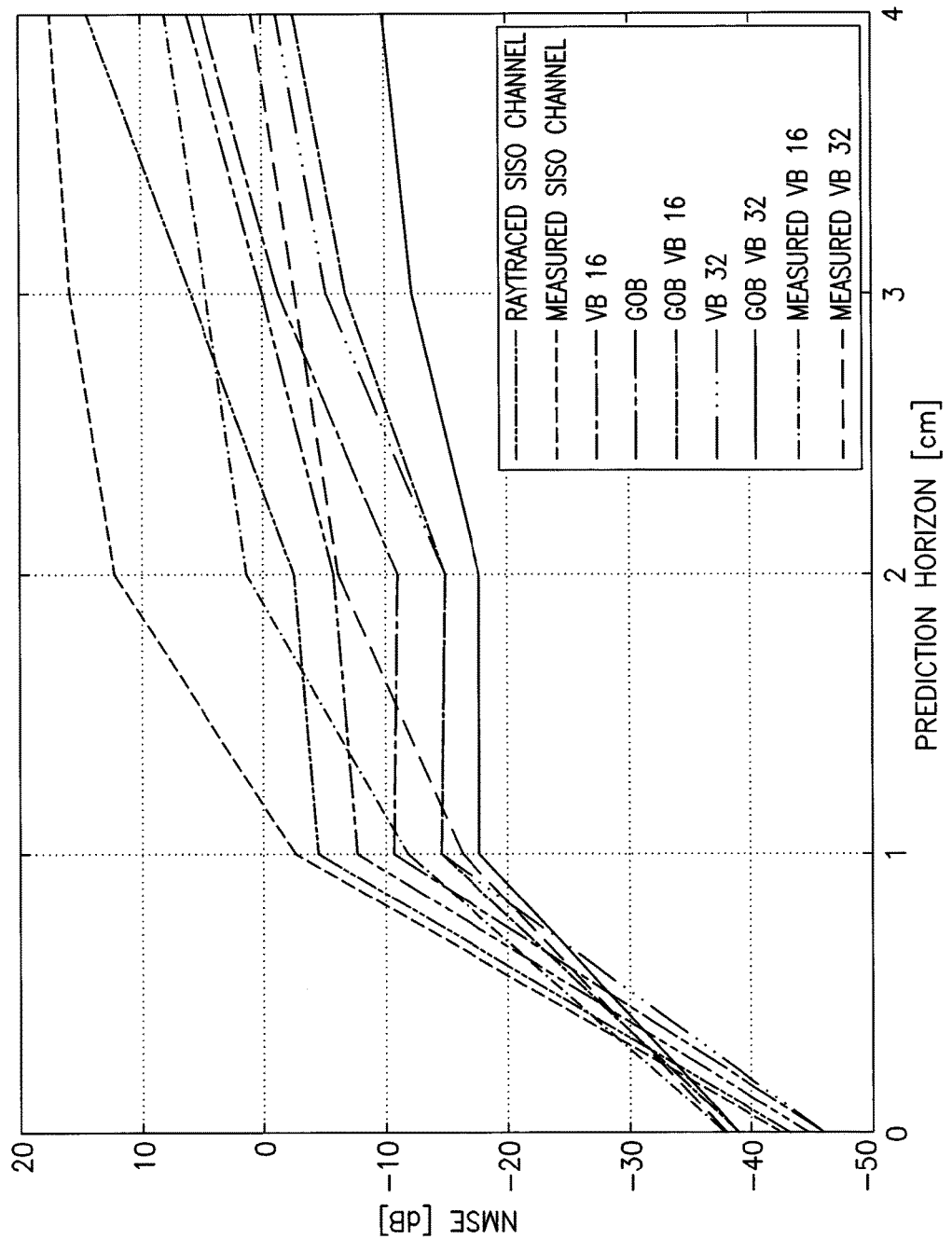
FIG. 4A is a chart showing simulation results with conventional Kalman filtering on CTF for different massive MIMO beamformers at the network side and virtual beamforming over 1, 16 or 32 virtual antennas for measured and ray traced radio channels.
Figure 4B:
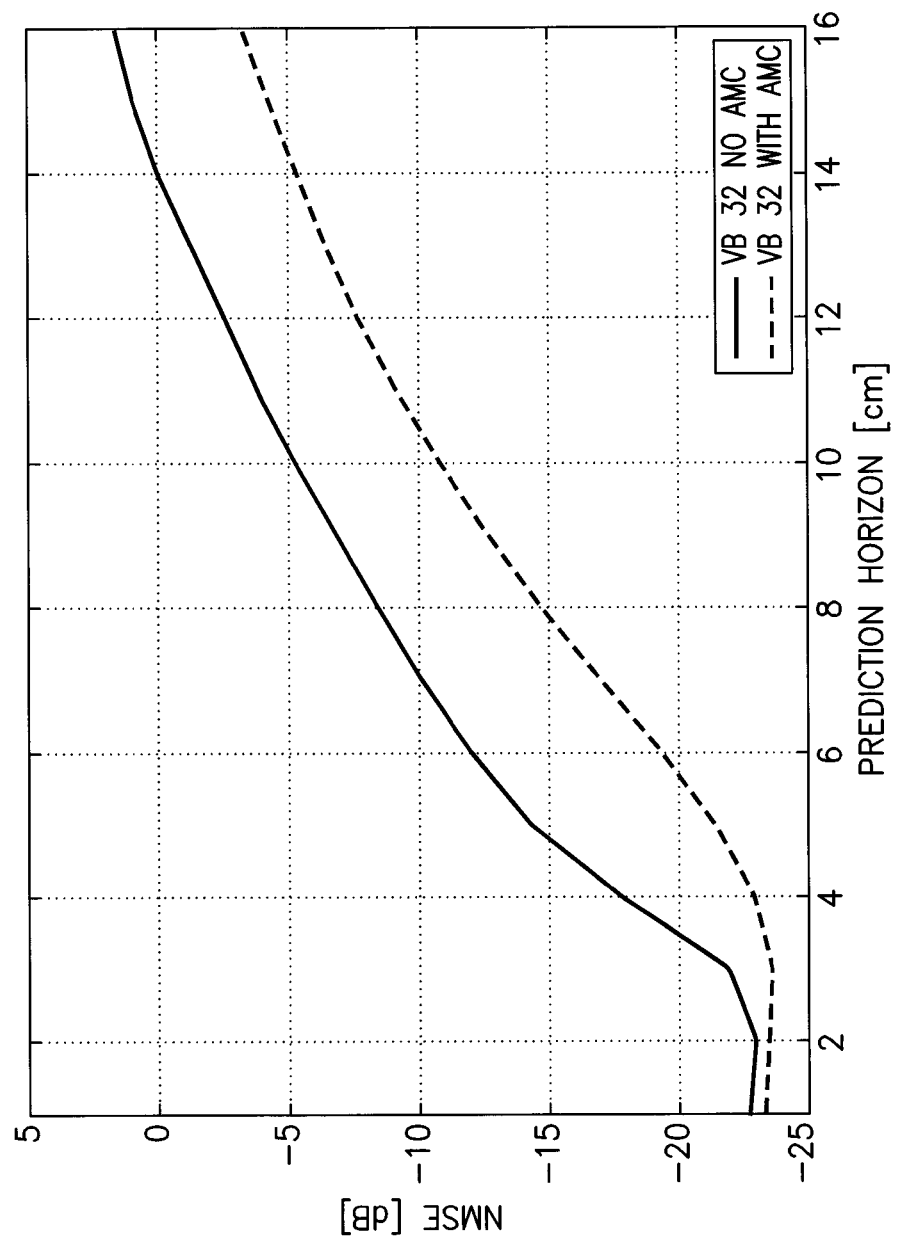
FIG. 4B is a comparison of a simple linear predictor per tap of the channel impulse response, with and without artificial mutual coupling.

As a baseline for comparison, FIG. 4A plots simulation results with conventional Kalman filtering on the channel transfer function for different massive MIMO grid of beams (GoB) beamformers at the network/transmitter side and virtual beamforming over 1, 16 or 32 virtual antennas for measured and ray traced radio channels. FIG. 4B compares a simple linear predictor per tap of the channel impulse response (CIR) for virtual beamforming over 32 measurement locations, with and without artificial mutual coupling. FIG. 4B shows it is possible to achieve a prediction horizon of 0.2 to 0.4λ, for a complex non-line of sight (NLOS) radio channel. Equivalently this means a prediction horizon of 10 ms for mobile devices moving with a speed of 15 km/h while using a RF-frequency of 2.6 GHz. The normalized mean square error (NMSE) was below −20 dB and thereby considerably outperforms state of the art predictors like Kalman filters shown at FIG. 4A.

It is remarkable that this has been achieved using only a most simple linear predictor applied to the taps of the channel impulse response (CIR), i.e. in the time domain. The reason for the improved performance in the time domain as compared to the frequency domain (CIR compared to CTF) is that a low number of multipath components translates to a large coherence time, while in the frequency domain the coherence bandwidth can be still quite small. In addition, notches in the channel transfer function are typically very volatile even for relative small variations in the CIR.

Super directivity gains using artificial mutual coupling according to the teachings herein can be used for the following applications in wireless radio systems such as for example future 5G systems:
  for measured radio channels, virtual beamforming in combination with super directivity improves channel prediction performance significantly, as shown at FIG. 4B
  super directivity at the mobile radio devices will further allow the mobile devices to suppress interference from other beams, cells or sites. That enables a much simpler overall system concept, for example with a significantly reduced overhead for reporting of CSI information, a lower feedback rate for CSI prediction due to the larger prediction horizon, and so on for other measurement and control signaling.
  For the radio network access nodes (eNBs/base stations) different additional benefits are anticipated such as a smaller dimension of antenna panels which provide similar directivity as physically large and massive MIMO arrays having a much higher total number of antenna elements. As a direct consequence the number of active antenna elements might be reduced quite significantly, which will reduce overall power consumption, implementation costs, and system complexity.

From FIG. 4B it is clear that a time domain prediction on the taps of the channel impulse response performs very well compared to the much more complex Kalman-filtering in the frequency domain on the channel transfer function, at least for the large number of 32 virtual antenna elements used for FIG. 4B. Artificial mutual coupling allows for even larger prediction horizons of about 0.4λ with a simultaneously very low normalized mean square error of less than 20 dB. To prove the advantages of artificial mutual coupling quantitatively, the simulation results presented herein are only for simple linear predictions on the virtually beamformed and artificially mutually coupled channel impulse response. Certainly more advanced parameter estimation techniques like autoregressive Kalman filters, ESPRIT based parameter estimation, higher order singular value decomposition, etc. can be utilized as known techniques. Such more advanced estimation techniques are likely to lead to higher prediction horizons, or they may enable one to reduce the number of virtual—respectively physical—antenna elements and thereby reduce the overall system complexity even further.

Given the significant advantages in performance, array size and system complexity (particularly on the mobile device side) presented above, the use of artificial mutual coupling of antennas, particularly in combination with virtual beamforming, has the potential to drastically change the course of development for 5G. For example, to the inventors' knowledge it has never before been done to robustly predict a complex real world measured non-line of sight channel with a larger prediction horizon; no other state of the art prediction technique known to the inventors can achieve such a result. Robustness of channel prediction has become an important consideration by standardization bodies for adopting channel predictions into radio access technology-wide specifications.

Figure 5:
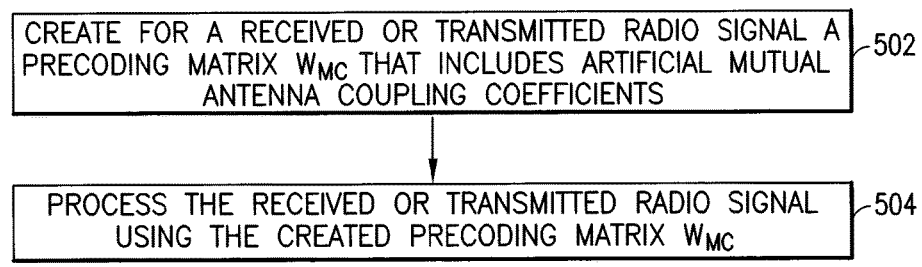
FIG. 5 is a process flow diagram summarizing certain aspects of these teachings.

FIG. 5 is a process flow diagram illustrating some of the higher level aspects of the above teachings. FIG. 5 is from the perspective of the mobile radio device respecting receiving the radio signal, and from the perspective of the radio network access node (e.g., eNB, base station, remote radio head, etc.) respecting transmitting the radio signal. At block 502 the relevant radio apparatus creates for a received or transmitted radio signal a precoding matrix $W_{MC}$ that includes artificial mutual antenna coupling coefficients; and at block 504 the apparatus processes the received or transmitted radio signal using the created precoding matrix $W_{MC}$. For the case of the transmitted signal the precoding matrix and the processing of FIG. 5 occur prior to the signal actually being transmitted from the antenna array.

As described in further detail above: in some embodiments the artificial mutual antenna coupling coefficients are selected to increase directionality of the received radio signal and in others to increase the directionality of the transmitted radio signal; in some embodiments the artificial mutual antenna coupling coefficients are selected to achieve strong beamforming gains enabling an accurate time-domain estimate of the channel over which the radio signal propagates (for example, the time domain estimate of the channel is the channel impulse response CIR). Despite the simple linear prediction on each tap of the CIR a prediction horizon of at least 0.3λ, where λ is wavelength of the received radio signal, could be achieved; and as shown further quantitatively the time-domain estimate of the channel was obtained via a linear prediction of the virtually beamformed and artificially mutually coupled channel impulse response, and that linear prediction had a normalized mean square error no greater than 20 dB).

Above it was also shown that the precoding matrix $W_{MC}$ is combined with a virtual beamformer matrix such that the non-zero virtual beamforming coefficients consist only of diagonal elements of the precoding matrix and the artificial mutual antenna coupling coefficients consist only of off-diagonal elements of the precoding matrix, and that the artificial mutual antenna coupling coefficients are taken from (and thus approximate) SI-functions which generate 1 values at the matrix diagonals. In one embodiment the SI functions are allocated as a block Toeplitz matrix. In one specific example the precoding matrix $W_{MC}$ was an N*N size matrix where N is an integer number of antennas from which the radio signal was transmitted, and the artificial mutual antenna coupling coefficients couple each of the N antenna elements to each of the other N antenna elements.

Where block 502 concerns the received radio signal and FIG. 5 is performed by the mobile radio device which receives the radio signal, and the artificial mutual antenna coupling coefficients are selected to mutually couple groups of antenna elements of a multi-group antenna array at an access node of a radio network which transmitted the radio signal, where each of the artificially mutually coupled groups have at least 2 antenna elements. Where block 502 concerns the transmitted radio signal and FIG. 5 is performed by the mobile by an access node of a radio network which transmits the radio signal, the access node may transmit the radio signal from at least 2 groups of antenna elements of a multi-group antenna array and the artificial mutual antenna coupling coefficients are selected to mutually couple antenna elements across the at least two groups.

According to another aspect of these teachings artificial mutual coupling can be switched on and off cell-wide, or for individual UEs operating within the cell. In this aspect there is sent or received, between a network access node and a user equipment, a downlink control message that switches on or off artificial mutual coupling of antennas for downlink radio signals. In response to this message downlink radio signals are processed according to whether the artificial mutual coupling of antennas is switched on or off. For cell-wide decisions this downlink control message may be included with broadcast system information; for individual UE switching on/off the artificial mutual coupling the downlink control message will be a point to point message, or alternatively the switching can be for a group of UEs such as a device-to-device D2D cluster here the downlink control message may be a point-to-point message to the cluster head or a single group-wide message simultaneously to all of the grouped UEs (e.g., addressed to a group identifier).

This aspect may be performed by the user equipment which receives the downlink control message, and in one particular embodiment to reduce battery consumption in the user equipment the downlink control message switches off the artificial mutual coupling and is generated in response to an uplink message from the user equipment to the network access node indicating a performance metric of the user equipment, for example that a battery level in the user equipment is low.

This aspect may also be performed by the network access node which sends the downlink control message, and in one particular embodiment in which artificial mutual antenna coupling is switched on and off based on traffic loading in the cell the network access node generates the downlink control message which switches off the artificial mutual coupling in response to determining that traffic loading in its cell is currently low enough that artificial mutual coupling is not needed (for example, traffic below a threshold, no data buffers exceeding some threshold fill level, no scheduling requests aged more than some threshold time period, etc.). In another particular embodiment artificial mutual antenna coupling is switched on and off with some other mode switching, such as switching between joint transmission (JT) CoMP and massive MIMO modes. For example, if it becomes standardized in a given radio access technology that such mode switching is to be done together, the same control signaling between the network and the mobile radio device for switching between JT CoMP and MIMO modes can also be used to simultaneously indicate switching the artificial mutual antenna coupling mode between off and on.

It may be that some legacy UEs operate in the same cell as other UEs that can use artificial mutual antenna coupling. In this case there is another aspect of the invention in which a radio network access node determines that a specific user equipment is capable of processing radio signals using virtual beamforming and artificial mutual antenna coupling; and in response to the access node transmits to the specific user equipment radio signals for which at least two antenna elements used for the transmitting are coupled artificially. As detailed more specifically above, one way to artificially couple those at least two antenna elements used for the transmitting is by adding artificial mutual antenna coupling coefficients to a precoding matrix $W_{MC}$ that is used to process the radio signals prior to transmitting those radio signals from those at least two antenna elements. Also as detailed further above, the added artificial mutual antenna coupling coefficients increase directionality of the transmitted radio signals as compared to if the radio signals were transmitted after being precoded with the precoding matrix $W_{MC}$ without the added artificial mutual antenna coupling coefficients.

One way for the radio network access node to make the above determination is from reading the UE capability information, which it can receive from the specific user equipment in reply to a UE capability enquiry sent from the access node, or alternatively the access node can receive it from a mobility management entity (MME) when the specific user equipment becomes attached to the access node such as after a handover/reselection. For the case of the legacy UEs, the access node can further determine that a different second user equipment is not capable of processing radio signals using virtual beamforming and artificial mutual antenna coupling; and in response the access node will refrain from transmitting to the second user equipment radio signals for which at least two antenna elements used for the transmitting are coupled artificially.

Any of the above aspects of the invention, and combinations thereof, can be embodied in a mobile radio device such as a UE, as well as in a radio network access node such as an eNB, base station, access point, remote radio head and the like. Similarly they may be embodied in one or more components thereof, and so in general embodiments of the invention can be as an apparatus comprising at least one processor and at least one memory storing computer instructions. In these embodiments shown more particularly at FIG. 6 below, the at least one processor is configured with the memory and the stored computer instructions to cause the apparatus to perform the method or methods as detailed above.

Other embodiments of these teachings can be embodied as a computer-readable memory storing computer instructions which, when executed by the processor, cause a host radio device to perform the method or methods as detailed above. Such a computer-readable memory is also shown more particularly below at FIG. 6. In these embodiments the host device can be implemented for example as the mobile radio device or as the access node mentioned above.

Figure 6:
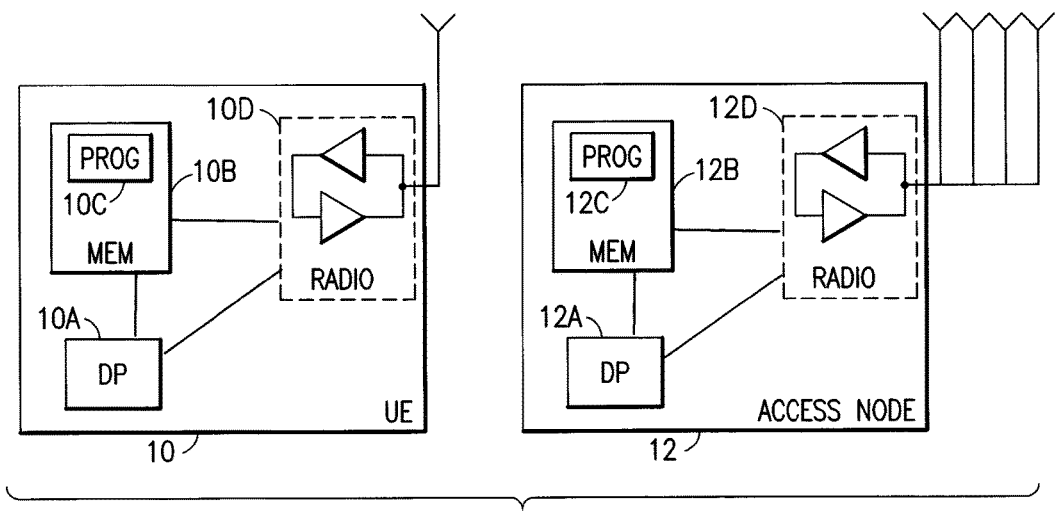
FIG. 6 is a high level schematic block diagram of some exemplary communication entities in which embodiments of these teachings may be disposed to exploit the advantages thereof.

FIG. 6 is a high level diagram illustrating some components of different communication entities on opposite side of the conventional wireless divide in a generic radio communications network. The access node 12 corresponds to the entity of the radio access network that sends radio signals to the mobile users/mobile radio devices, which are represented by the user equipment UE 10 which sends its information uplink to the radio access network via the access node 12. The access node 12 may be embodied as a cellular base station, NodeB, eNB, access point, relay node or remote radio head for example; while the UE 10 may be embodied as a handheld mobile radio device such as a smartphone, or a wearable or implantable version thereof. The radio access network may include a network control element (NCE, not shown) that may include mobility management entity/serving gateway functionality to provide connectivity with another network such as a publicly switched telephone network and/or a data communications network (e.g., the internet).

The UE 10 includes a controller, such as a computer or a data processor (DP) 10A, a computer-readable memory medium embodied as a memory (MEM) 10B that stores a program of computer instructions (PROG) 10C, and a suitable wireless interface such as radio 10D (shown as a transmitter and receiver) for bidirectional wireless communications with the access node 12 via one or more antennas 10E.

Similarly the access node 12 also includes a controller, such as a computer or a data processor (DP) 12A, a computer-readable memory medium embodied as a memory (MEM) 12B that stores a program of computer instructions (PROG) 12C, and a suitable wireless interface such as a radio 12D (shown as a transmitter and receiver) for bidirectional wireless communications with the UE 10 via one or more antennas 12E, of which 4 are shown to match the example above where N=4 antenna elements were used for the transmission to the mobile device/UE 10. The access node 12 may be coupled via a data/control path to the NCE (not shown) as well as to other access nodes via similar peer data/control paths.

At least one of the PROGs 10C, 12C is assumed to include program instructions that, when executed by the associated DP, enable the device to operate in accordance with the relevant communications protocol, and may comprise computer software executable by the DP 10A of the UE 10; and by the DP 12A of the access node 12, or by hardware, or by a combination of software and hardware (and firmware).

The UE 10 and/or the access node 12 may also include dedicated processors, for example in the radio 10D/12D or elsewhere. Such dedicated modules may be constructed so as to embody aspects of the invention as detailed herein. That is, embodiments of the processes shown by example and more specifically described herein may be disposed in the illustrated DPs 10A/12A, or in dedicated modules or chips such as a RF front end chip/module that forms part of the illustrated radios 10D/12D, and particularly the transmitter and receiver portion of such radios 10D/12D. In other implementations these teachings may be implemented in software stored in the MEMs 10B/12B which create the matrices with the artificial mutual coupling coefficients as detailed above.

The DPs 10A and 12A, and any dedicated processing chips implementing these teachings, may be of any type of circuitry comprising interconnected logical gates that is/are suitable to the local technical environment, and may include one or more of general purpose computers, special purpose computers, microprocessors, digital signal processors (DSPs) and processors based on a multicore processor architecture, as non-limiting examples. The wireless interfaces (e.g., radios 10D and 12D) may be of any type suitable to the local technical environment and may be implemented using any suitable communication technology such as individual transmitters, receivers, transceivers or a combination of such components.

In general, the various embodiments of the UE 10 can include, but are not limited to, smart phones whether handheld, wearable on the body or implantable in whole or in part within the user's body; other types of cellular telephones including those fixedly or removably disposed in vehicles such as automobiles and watercraft; personal digital assistants (PDAs) having wireless communication capabilities; portable computers having wireless communication capabilities including laptops, palmtops, tablets and e-readers; image capture devices such as digital cameras having wireless communication capabilities; gaming devices having wireless communication capabilities; music storage and playback appliances having wireless communication capabilities; Internet appliances permitting wireless Internet access and browsing; as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. Any combination of one or more computer readable medium(s) may be utilized as a memory 10B/12B. The computer readable medium may be a computer readable signal medium or a non-transitory computer readable storage medium. A non-transitory computer readable storage medium does not include propagating signals and may be, for example, but not limited to: an electronic, magnetic, optical, electromagnetic, infrared, or semiconductor system, apparatus, or device; or any suitable combination of the foregoing. A more specific but non-exhaustive list of examples for the computer readable storage medium include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

While FIG. 6 illustrates a UE 10 and access node 12, these teachings are not limited thereto but the mobile device teachings can be embodied in machine-type communications devices that operate without specific user inputs, and the arrayed transmissions may be sent by other than an access node 12 of a radio access network.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

Acronyms used herein:
3GPP Third Generation Partnership Project
5G fifth generation of mobile radio systems
AMC artificial mutual coupling
CoMP cooperative multipoint transmission
CSI channel state information
CTF channel transfer function
eNB enhanced node B
FDD frequency division duplex
GoB grid of beams
LTE-A long term evolution-advanced (of 3GPP)
MIMO multiple input multiple output
RF radio frequency
RS reference signal
RX receive
TX transmit
UE user equipment
ULA uniform linear array

What is claimed is:

1. An apparatus comprising at least one processor and at least one memory storing computer instructions, wherein the at least one processor is configured with the memory and the stored computer instructions to cause the apparatus to:
   create for a received or transmitted radio signal a precoding matrix $W_{MC}$ that includes artificial mutual antenna coupling coefficients; and
   process the received or transmitted radio signal using the created precoding matrix $W_{MC}$,
   wherein the artificial mutual antenna coupling coefficients are selected so as to increase accuracy or coherence interval of a time-domain estimate of a channel over which the radio signal propagates, and
   wherein the time-domain estimate of the channel is obtained via a linear prediction on taps of a virtually beamformed and artificially mutually coupled channel impulse response, said linear prediction per tap minimizing the normalized mean square error for the predicted channel state impulse response.

2. The apparatus according to claim 1, in which the artificial mutual antenna coupling coefficients are selected to increase directionality of the received or transmitted radio signal.

3. The apparatus according to claim 1, wherein the precoding matrix $W_{MC}$ is combined with a virtual beamformer matrix having only diagonal elements unequal to zero.

4. The apparatus according to claim 3, wherein the precoding matrix $W_{MC}$ includes non-zero virtual beamforming coefficients within only its diagonal elements and the artificial mutual antenna coupling coefficients within only its non-diagonal elements.

5. The apparatus according to claim 1, wherein the artificial mutual antenna coupling coefficients approximate SI-functions which generate a value of one at the matrix diagonal elements.

6. The apparatus according to claim 5, wherein the SI functions are allocated in the form of a block Toeplitz matrix.

7. The apparatus according to claim 1, wherein the precoding matrix $W_{MC}$ is an N*N size matrix where N is an integer number of antennas from which the transmitted or received radio signal was transmitted, and the artificial mutual antenna coupling coefficients couple each of the N antenna elements to each of the other N antenna elements.

8. The apparatus according to claim 1, wherein the artificial mutual antenna coupling coefficients are selected to mutually couple groups of at least two antenna elements of a multi-group antenna array.

9. An apparatus comprising at least one processor and at least one memory storing computer instructions, wherein the at least one processor is configured with the memory and the stored computer instructions to cause the apparatus to:
   send or receive a downlink control message between a network access node and a user equipment that switches on or off artificial mutual coupling of antennas for downlink radio signals and/or configures parameters for the artificial mutual coupling; and in response process downlink radio signals according to whether the artificial mutual coupling of antennas is switched on or off.

10. The apparatus according to claim 9, wherein the method is performed by the user equipment which receives the downlink control message.

11. The apparatus according to claim 9, in which the downlink control message switches off the artificial mutual coupling and is transmitted or received in response to an uplink message from the user equipment to the network access node indicating a performance metric of the user equipment.

12. The apparatus according to claim 9, wherein the method is performed by the network access node which sends the downlink control message.

13. The apparatus according to claim 9, the at least one processor further configured with the memory and the stored computer instructions to cause the apparatus to:
   generate the downlink control message which switches off the artificial mutual coupling in response to determining that traffic loading in its cell is currently low enough that artificial mutual coupling is not needed.

14. The apparatus according to claim 9, the at least one processor further configured with the memory and the stored computer instructions to cause the apparatus, when the downlink control message indicates that the artificial mutual coupling of antennas is switched on, to:
   create for a received or transmitted radio signal a precoding matrix $W_{MC}$ that includes artificial mutual antenna coupling coefficients; and
   process the received or transmitted radio signal using the created precoding matrix $W_{MC}$.

15. A method comprising:
   creating for a received or transmitted radio signal a precoding matrix $W_{MC}$ that includes artificial mutual antenna coupling coefficients; and
   processing the received or transmitted radio signal using the created precoding matrix $W_{MC}$,
   wherein the artificial mutual antenna coupling coefficients are selected so as to increase accuracy or coherence interval of a time-domain estimate of a channel over which the radio signal propagates, and
   wherein the time-domain estimate of the channel is obtained via a linear prediction on taps of a virtually beamformed and artificially mutually coupled channel impulse response, said linear prediction per tap minimizing the normalized mean square error for the predicted channel state impulse response.

16. The method according to claim 15, in which the artificial mutual antenna coupling coefficients are selected to increase directionality of the received or transmitted radio signal.

* * * * *